US006442895B1

(12) United States Patent
Van Roey (10) Patent No.: US 6,442,895 B1
(45) Date of Patent: Sep. 3, 2002

(54) PLANT CONTAINER ASSEMBLY

(75) Inventor: Herman Van Roey, Rijkevorsel (BE)

(73) Assignee: Jan Van Roey, Merksplas (BE)

( * ) Notice: Subject to any disclaimer, the term of this patent is extended or adjusted under 35 U.S.C. 154(b) by 0 days.

(21) Appl. No.: 09/709,381

(22) Filed: Nov. 13, 2000

Related U.S. Application Data (63) Continuation-in-part of application No. PCT/BE99/00062, filed on May 12, 1999.

(30) Foreign Application Priority Data

May 12, 1998 (EP) .............................. 98201550

(51) Int. Cl.[7] ................................. A01G 9/02
(52) U.S. Cl. ........................................ 47/82
(58) Field of Search ................. 47/75, 82, 83

(56) References Cited

U.S. PATENT DOCUMENTS

| 3,293,798 A | | 12/1966 | Johnson | |
| 4,736,543 A | * | 4/1988 | Erdmann | 47/82 |
| 5,309,671 A | | 5/1994 | Byun | |
| 5,438,797 A | | 8/1995 | Lendel | |
| 6,302,368 B1 | * | 10/2001 | Tsappi | 248/523 |

FOREIGN PATENT DOCUMENTS

| DE | 2503758 | 8/1976 |
| DE | 3935433 | 4/1991 |
| EP | 0291384 | 11/1998 |
| FR | 2545319 | 11/1984 |
| FR | 2733117 | 10/1996 |

* cited by examiner

Primary Examiner—Charles T. Jordan
Assistant Examiner—Francis T. Palo
(74) Attorney, Agent, or Firm—Piper Rudnick LLP; Jerold I. Schneider (57) ABSTRACT

An internal construction device for assembling a plant from a plurality of smaller plants, the device comprising a support pole which extends in the height direction of the construction, and a plurality of superimposed retainers applied around the support pole and nested within each other, the retainers being provided for receiving dirt and plants. A retainer underneath comprises a side wall and a top face; a subsequent retainer comprises a side wall and a bottom face. The top face of the retainer underneath has a larger surface area than the bottom face of the subsequent retainer so as to create, between the side walls of both retainers, a space for receiving plants. The retainer is a casing having a side wall, top face and bottom, the top and bottom faces being substantially open. The casing is connected to the support pole.

10 Claims, 8 Drawing Sheets

PLANT CONTAINER ASSEMBLY

CROSS-REFERENCE TO RELATED APPLICATIONS

This application is based upon, and claims priority from, and is a continuation-in-part of European Application No. 98201550.5 filed May 12, 1998, and PCT Application No. PCT/BE99/00062 filed May 1999, both of which are hereby incorporated by reference.

BACKGROUND

The present invention relates to an internal construction device for assembling a large plant from a plurality of smaller plants, the device comprising (1) a support pole extending in height direction of the device, (2) a plurality of superimposed retainers mounted above each other around the support pole and being at least partly nested within each other, the retainers having a central storage volume for receiving dirt and plants and a substantially open top face, (3) supporting means for supporting each retainer. A retainer underneath comprises a side wall and a top face with a surface area. A subsequent retainer above the retainer underneath comprises a side wall and a bottom face with a surface area, the surface area of the top face of the retainer underneath being larger than the surface area of the bottom face of the subsequent retainer so as to create between the side walls of both retainers a space for receiving plants.

Such a vertical tiered sectional planter is known from U.S. Pat. No. 3,293,798. The vertical tiered sectional planter of U.S. Pat. No. 3,293,798 comprises a circular, flat, pan shaped base which is positioned in a corresponding recess in the ground. A circular, pan shaped bottom section is nested within the base and rests with its bottom wall on a horizontal screen secured to the side-wall of the base section. An upstanding, vertically elongated standard is fixed within the base. A plurality of pan shaped sections are secured around the standard. The lower part of the side wall of each section is perforated to allow moisture to escape in a controlled way through the side wall perforations and to fall onto the peripheral parts of the bed below. The dimensions of the sections are chosen such that the side walls of subsequent sections are spaced apart radially so that between the top rim of the lower section and the side wall of the subsequent section a bed is created for receiving shoots.

The vertical tiered planter disclosed in U.S. Pat. No. 5,438,797 aims at increasing the planting area without thereby increasing the floor space occupied by it and at culturing polycultures within one planter, for example vegetables, flowers, strawberries and even potatoes. It is designed to provide a maximum access to the beds, while at the same time affording a maximum exposure of the shoots to sunlight and rain and occupying a minimum of ground area. The planter of U.S. Pat. No. 5,438,797 comprises an upstanding, vertically elongated standard around which the flower pots are arranged. Each flower pot is supported in two ways. A first support means is formed by the dirt in the pot. As a second support means, each pot rests with its bottom onto a bar which extends through the segmented pole.

In FR-A-2.733.117 a culture tower is disclosed which comprises a plurality of retainers succeeding each other in height direction of the tower. The retainers are mounted on a rigid support composed of three vertically extending rectilinear poles, regularly distributed in circumferential direction of the wall of the tower. Every pole consists of a plurality of superimposed profiles which engage each other in height direction of the tower, each profile comprising a lateral restraint for receiving the retainer and maintaining subsequent retainers at a pre-determined distance from each other. The culture tower disclosed in FR-A-2.733.117 is intended to grow a large number of small vegetables, small plants and aromatics on a small ground area.

FR-A-2.545.313 relates to a device for the intensive culture of vegetal plants. Thereto, use is made of a pyramidal device of a plurality of in height direction superimposed floors. The side walls of the floors are formed by laterally inclined plates, which form a physical obstacle with a tendency to exert a guiding effect to the development of the roots towards the central zone of the pyramid.

SUMMARY

It is the object of the present invention to provide a different concept of a plant growing device, namely an internal construction for a plant with which a full-grown plant or tree or shrub or the like can be assembled from small plants in a simple way, and in particular within a relatively short period of time.

This is achieved according to the present invention with the technical features of the characterising part of the first claim.

The retainer of the internal construction device of the present invention is in fact a casing with a side wall and an open bottom face which enclose a central storage space, the central storage spaces of subsequent or superimposed retainers being connected to each other and transferring into each other in a jointless manner.

It has been found with this invention that the connection of the subsequent central storage spaces renders the device particularly suitable for constructing a full-grown plant or shrub or a tree like plant of any desired shape, starting from a plurality of smaller shrubs or tree plants. After a relatively short period of time the device as such is no longer visible from the outside.

The device of this invention constitutes in fact an internal construction or internal framework in which a plurality of smaller plants can be assembled or housed, and from which the plants may extend in all directions to form to a tree or a shrub like plant or a large plant or the like, the framework being hidden by the plants. The device of this invention is conceived as a frame for containing the dirt for the plants, the frame being no longer visible from the outside and being provided to be hidden by the plants housed in it. As the central storage volumes of subsequent retainers and thus the dirt contained therein are connected to each other and transfer into each other in a jointless manner, the central storage spaces of subsequent retainers appear to form one large growing volume for the roots, so that the dirt of a specific level is not only accessible to the roots of plants housed in that particular level or retainer, but is also accessible to the roots of the plants located in higher levels. As a consequence the growth of the roots and the plants is not limited by the dirt volume of the retainer they are housed in, but is extended to wards the interior of the lower retainers. Because of this, the frame of the presumed full-grown plant obtainable with the device of this invention is comparable to the interior of a full grown tree, which is composed of a plurality of branched internal branches, which often don't carry any leaves and form a frame for the outer, leave carrying branches to supply them with feed and moisture. Nor the frame as such, nor the result obtainable with such a frame can be derived from the state of the art.

It has surprisingly been found that plants planted in the device of this invention can grow to a larger size as compared to conventional planters, where the maximum size and the life time of the plants is usually limited. This is surprising as plants of shrubs and trees mostly only show a good growth when planted in full ground. An analysis of the problem has revealed that this may most probably attributed to the interconnection of the central storage spaces of the retainers, which appears to approach the conditions provided by the soil of a garden or the like, and through which the roots dispose of a larger volume of growing medium and a larger growing space and thus may grow to a larger extent.

The observed longer lifetime of the plants in the device of this invention as compared to plants housed in conventional planters can presumably also be attributed to the fact that the roots can dispose of a larger volume of dirt. The accessibility of a larger volume of dirt improves the feed of which the plant can dispose and allows a more even distribution of moisture, nutrients and fertilisers, supplied from the outside to the device, to be achieved, thus promoting the plant feed. The dirt contained in subsequent retainers in fact forms one large, growing medium, wherein the roots of the plants have a large degree of freedom to grow and develop themselves, which appears to have a positive influence on the growth and lifetime of the plants.

These results cannot be attained with the planter known from the state of the art. Because of the presence of a closed bottom in the known planter, the space that can be occupied by the roots is limited, thus limiting the growth of the plant.

In the device of this invention, the side wall of each casing is preferably connected to the support pole. This is done to provide a sturdy construction, the size of which can be varied within wide ranges by varying the size or shape of one or more of the retainers or the number of retainers in the device, without thereby involving the risk that the construction easily topples over upon an accidental bump. Namely, as the size of the individual casing and the number of superimposed casing increase, the weight of the device increases accordingly and the centre of gravity is shifted towards the top of the device. The connection of the individual casings to the support pole through their side wall involves that the bottom wall of the retainer may be left out without thereby adversely affecting the stability of the device.

The means for connecting the side wall of the casing to the support pole are preferably removably connectable to both the support pole and the casing, as this facilitates transport of the device. In that way the retainers may be commercialised as such, the device may be assembled in situ and the retainers attached to the support pole when assembling the device. The removable mounting also allows disassembling the device in case for example it is desired to move the device and displace the retainers in an individual manner.

The means for removably connecting the retainer to the support pole preferably comprise at least one support bar with two ends, the ends being provided to co-operate with holes in opposing sides of the side-wall of the casing, the support pole comprising at least on hole for receiving the support bar there through.

Another preferred possibility of removably connecting the retainers to the support pole consists in that the support pole comprises a plurality of holes, which extend throughout the support pole in cross direction thereof and are spaced from each other in height direction of the support pole. The holes are arranged in pairs of a first and second hole for receiving perpendicularly extending support bars. In that way each casing may be connected to the support pole at four positions. In a first pair, the lower hole extends in a first direction, the upper hole extends in a second direction perpendicular to the first direction. In a subsequent second pair, the lower hole extends in the second direction whereas the upper hole extends in the first direction. The distance between subsequent pairs of holes is adapted to the height of the side wall of the casing such that a retainer may be supported in two ways: (1) the retainer is hung to the support pole, by the upper and lower support bar; (2) the bottom rim of the retainer rests on the upper support bar of a retainer underneath.

This arrangement of the holes is preferred as it assists in improving the stability of the device. Namely a first retainer will rest on a support bar extending in a first direction, a second subsequent retainer resting on a support bar extending in a second perpendicular direction. In that way wobbling of the device may be counteracted.

Furthermore, clamping means may be provided to the ends of the support bar, to allow the side wall of the casing to be clamped between these clamping means. In that way expansion, sagging or deformation of the casing caused by the pressure exerted by the dirt contained in it and casings placed on top of it, may be minimised.

In an alternative embodiment of the invention opposite sides of the side wall of the casing are connected to the support pole through a vertical separation wall. The separation wall is preferably removably connectable to the side wall and the support pole. The presence of the side wall gives strength to the container thus increasing the ability of the container to retain its shape when filled with dirt. Because of the relatively large weight of the growth medium and the plants, the pressure experienced by an upper container to a container underneath may be significant and give rise to a sagging of the shape of the lower container or cause an undesirable deformation thereof. This sagging may get particularly important for the lower containers when stacking a plurality of containers on top of each other. In another preferred embodiment, at least two perpendicularly extending separation walls are mounted in the central storage space.

According to another preferred embodiment of this invention the device comprises a bottom casing which is provided to be placed upon a bottom plate, the bottom plate comprising means for displacing the device. In that way it is possible to provide a device which can be displaced from one location to the other as a unity, without thereby having to disassemble the individual retainers, and without thereby adversely influencing the life time and growth of the plants. Another possibility of doing this is to provide a hook to the top of the support pole to allow the device to be lifted, and to position the lower casing on a displaceable foot.

The application possibilities offered by the devices known from the art are limited and are limited to providing a planter with which (1) the planting area can be increased, without thereby increasing the ground area occupied by the planter, (2) gardening can be facilitated because the planters are located at a distance from the floor, and (3) different types of plants can be grown in a small area. There is no teaching in state of the art to conceive a planter as a frame for surrounding dirt for housing plants, the frame being provided to be hidden by the plants and to be almost unobservable from the outside. Nor is there any teaching in the state of the art to use this frame for constructing shrubs or trees, the growing of which would otherwise take years. Neither is there any teaching to use a frame to allow shrubs or threes to be constructed from a plurality of small plants which otherwise would not grow out towards a tree, such as for example creepers, rose plants etc. As has been explained above, the inventor attributes this finding to the fact that in the device of this invention the bottom wall of the casings is omitted and the central storage spaces are interconnected and transfer into each other in a jointless manner.

It is believed that the man skilled in the art is of the opinion that the presence of a bottom wall is necessary so as to prevent the dirt contained in the planter to subside too much. The inventor has now found that any subsidence that may occur does not adversely influence the plant construction and can be replenished by supplying additional dirt or any other growth medium. Also in the vertical tiered planters known from the art the presence of a bottom wall is necessary to provide a sufficient stability to the planter. In the present invention sufficient stability is provided by connecting the casings to the support pole, which in turn may be secured into the ground or a support bottom plate, so that the presence of a bottom wall in a casing becomes superfluous.

BRIEF DESCRIPTION OF THE FIGURES

The invention is further elucidated in the attached Figures and description of the Figures.

DETAILED DESCRIPTION

As can be seen from FIGS. 3–6, the internal plant construction device of this invention comprises a plurality of superimposed retainers 1, 10, mounted on top of each other around a central support pole 22.

Figure 2:
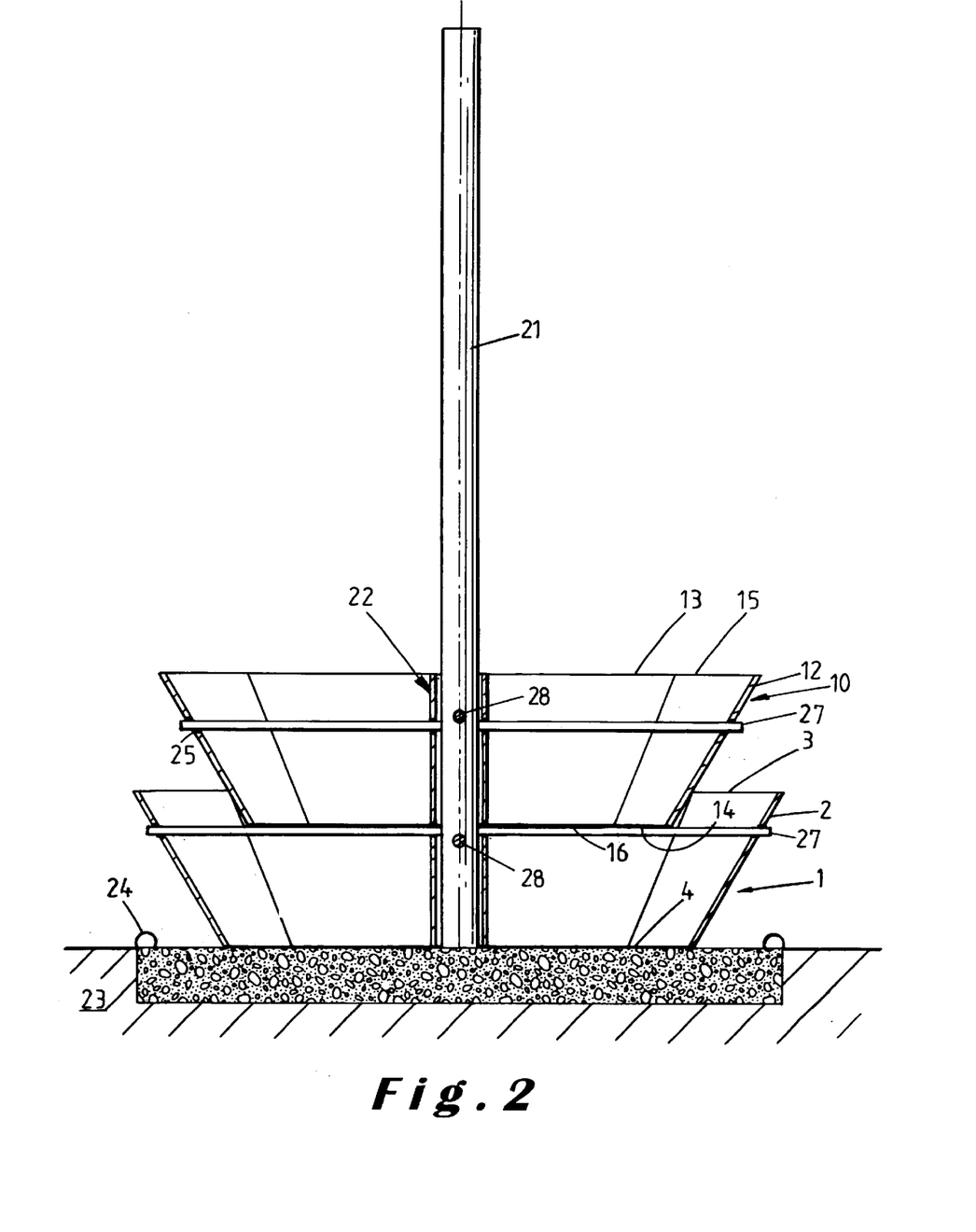
FIG. 2 shows part of the plant construction device of this invention in cross section.

The preferred embodiment of the device of this invention shown in FIG. 2 comprises a first and a second retainer 1, 10, both retainers being connected to a support pole 22 and mounted above each other.

Figure 1A:
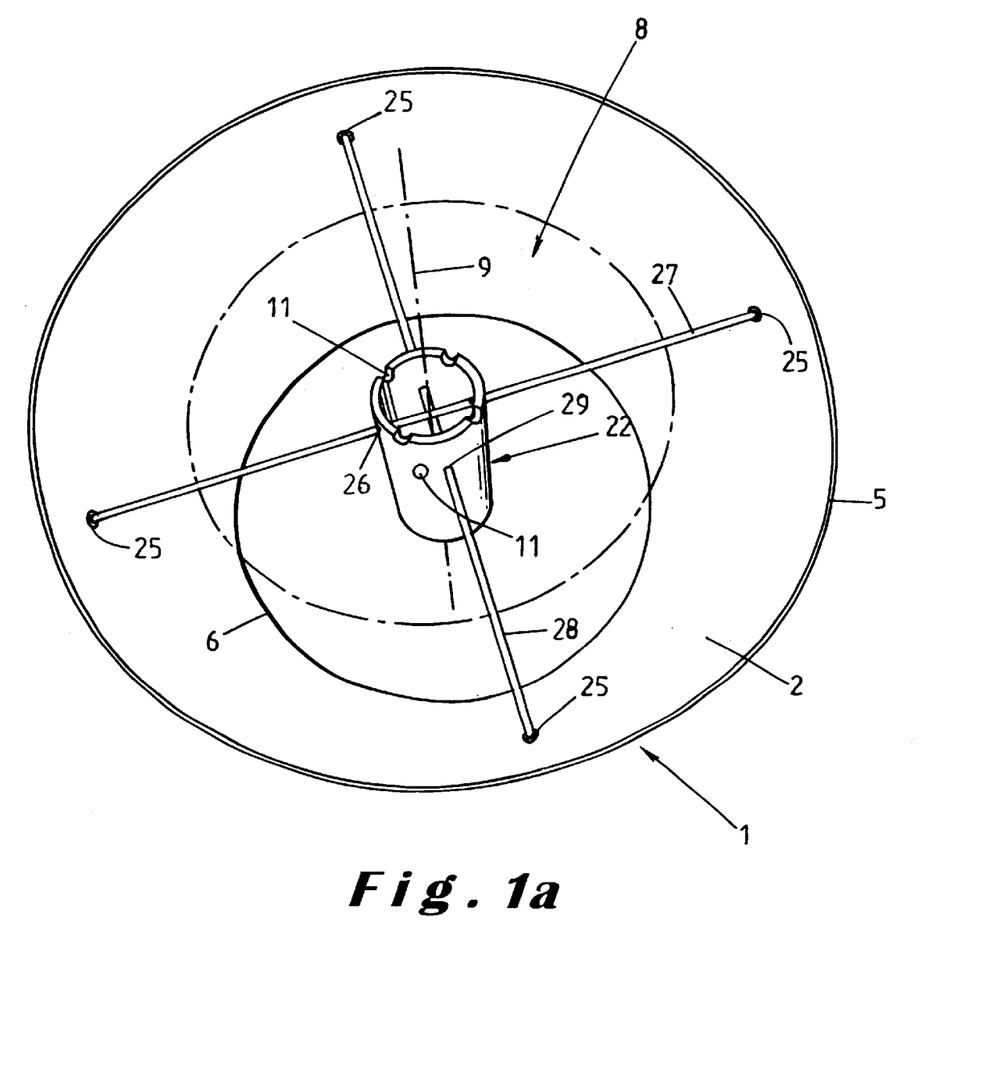
FIGS. 1a and 1b show a view to alternative embodiments of the retainer of the internal construction device of this invention.

Each retainer 1, 10 can be seen as a retainer comprising a side wall 2, 12, a top face 3, 13 and a bottom face 4, 14 enclosing a central storage space 8 for receiving dirt or any other medium and solid growth medium (FIG. 1 and 2). The top face 3, 13 and bottom 4, 14 are substantially open. In that way it can be achieved that the central storage space 8 of a lower casing 1 transfers into the central storage space of a casing 10 mounted on top of casing 1 in a jointless and continuous manner. The top face 3 has a surface area which is approximately equal to or larger than the surface area of the bottom 4, so that the side wall 2 is perpendicular or is inclined from the top 3 towards the bottom 4.

The device may be built up of casings which all have the same shape and dimensions or have widely varying shapes and dimensions. This is of particular importance in case devices of a particular shape, for example a wine bottle, an air balloon or a building have to be built. The sizes of the casing 1, 10 may further be varied depending on the desired size of the final plant to be assembled and the nature and size of the plants to be housed therein.

The casings 1, 10 may for example have the shape of a truncated cone or a truncated pyramid or be inverted. The bottom face 4 may be circular, oval, square, rectangular or have any other suitable shape. The same holds for the top face 3. The casing 1 shown in FIG. 1 for example has the shape of an inverted truncate cone. The surface area of top and bottom face 3, 4, 13, 14 and the height of the side wall 2, 12 may vary within wide ranges.

The casing 1, 10 may be manufactured from various, generally known materials, for example metal, for example aluminium, zinc, plastic material, concrete, wood.

Figure 1B:
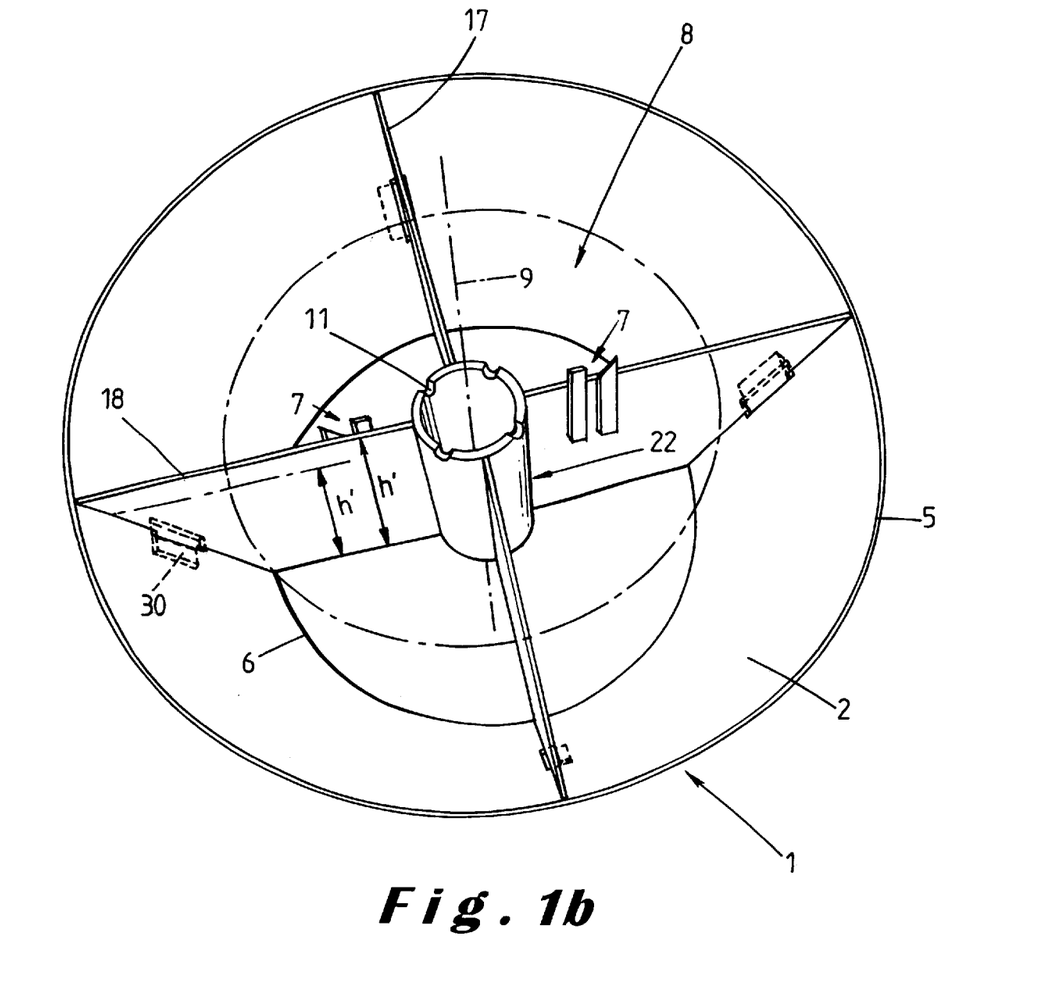

The support pole 22 to which the casings 1, 10 are attached, may be a bar or a tube which in turn is nested in the ground or into a bottom plate 23 to provide sufficient stability to the device. The support pole 22 may also consist of a plurality of bars or tubes interconnected in height direction of the support pole. The support pole 22 may be mounted centrally in the device as is shown in the Figures, but may also be decentralised in case this is for example imposed by constructive requirements. The internal construction device of this invention may also comprise a plurality of support poles 22 in case it is preferred for construction purposes. As can be seen from FIG. 1a and b and FIG. 2, the support pole 22 may be perforated, a central tube 21 may be mounted within it. The tube 21 is open at the top and is connected to a water supply so that the casings 1, 10 may be irrigated from the inside. On top of the support pole 22 a hook 24 may be mounted to allow the device to be lifted in its entirety.

Preferably every casing 1, 10 is connected to the support pole 22. Various connection possibilities exist: it is possible to suspend the casing to the support pole and/or to have superimposed casings resting on each other so that the casings 1, 10 support one another. The casings 1, 10 may be fixedly or removably connectable to the support pole, but are preferably removably connectable to allow in situ assembling of the device and disassembling thereof if it is desired to move the casings 1, 10 on an individual basis.

The means for connecting the casing 1, 10 to the support pole may comprise at least one bar 27, 28 which is removably connectable to the side wall 2 of the retainer 1. Thereto, means generally known to the man skilled in the art can be used. The support pole 22 preferably comprises in height direction thereof, a plurality of holes 29 for receiving support bars 28 there through. On opposing sides of the side wall 2, 12 of the casing 1, 10 preferably corresponding holes 25 are provided for receiving the support bar 28 therethrough. The holes 25 are preferably provided at such a position in the side wall 2, 12 that the bottom rim 6 of a casing 10 mounted on top rests on the support bar 28 of a casing 1 underneath as is shown in FIG. 2. In that case subsequent casings 1, 10 are nested within each other. It is also possible to connect the ends of the support bar 27, 28 to the upper rim 5 of the casing.

Figures 7, 8:
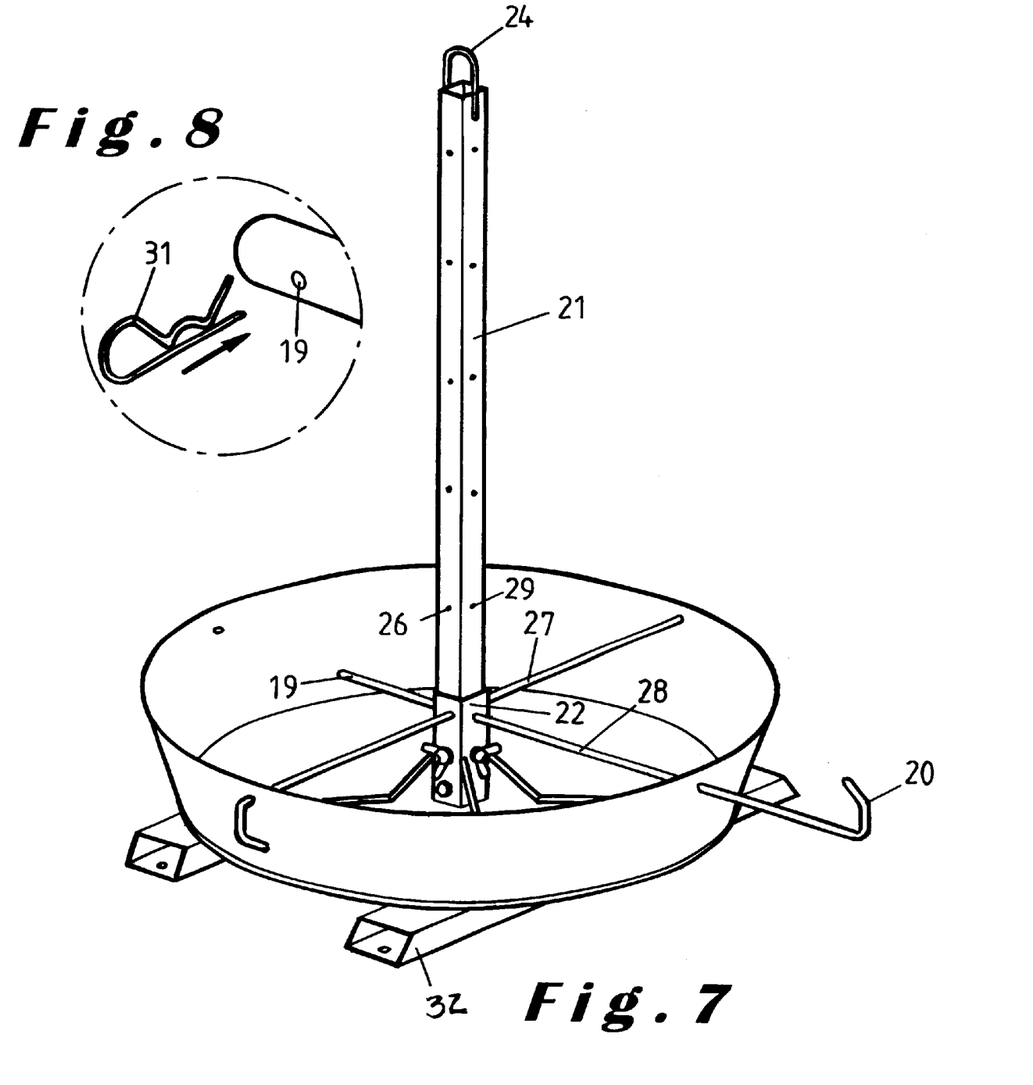
FIGS. 7 and 8 show a view to an alternative embodiment in which the side wall is clamped in by the supporting means for the casings.

In another embodiment shown in FIG. 7 in the support pole 22 a plurality of pairs of holes 26, 29 are provided in the support pole, the holes 29 and pairs of holes being spaced apart in height direction of the support pole 22. The holes 29 are provided to receive a first support bar 28 which extends in a first direction, the holes 26 are provided to receive a second support bar 27 which extends in a second direction. The second direction may for example be perpendicular to the first or any other suitable direction depending on the application and size of the device. In that way a casing 1, 10 may be suspended to the support pole 22 in a dual manner to improve the stability of the device. In a first pair of holes, hole 26 is mounted above hole 29, in a subsequent second pair of holes, hole 26 is mounted below hole 29. This is done to counteract waggling of the device to one or the other side after it has been mounted and filled with plants and its weight has substantially increased. Furthermore, the position of the holes 25 in the side wall 2, 12 of the casing 1, 10 and the position of the holes 26, 29 in the support pole 22 are adapted to the height of the side wall 2, 12 of the casing 1, 10 in such a way that the casing is not only suspended to the support pole, but also rests with its bottom rim 6 on the support bar 27, 28. In that way the stability of the device may be further improved.

A sagging of the casing 1, 10 may be counteracted by providing in the extremities of the support bars 27, 28 positioning means 19, 20, 31 for fixing the position of the casing on the support bars 27, 28. This can for example be done by providing in one extremity a hole 19 for receiving a clamp 31 and by providing the other extremity with a hook 20. After the casing has been mounted to the support bar, clamp 31 is inserted in hole 19, support bar 27, 28 is rotated so that the hook 20 points in upward direction and the side wall 2, 12 is clamped between clamp 31 and hook 20. However this may be done in other ways known to the man skilled in the art.

Another way of connecting the casing 1, 10 to the support pole 22 is by mounting in each casing 1, 10 one or more separation walls 17, 18, which may be connected to the support pole 22 or not. The separation walls 17, 18 may be connected permanently with the support pole 22 or be removably connected so as to facilitate the transport and storage of the casings and the construction in an un-mounted manner. The height of the separation wall h' may be the same as or different from the height of the side wall 2 of the casing 1, 10. To connect the separation walls 17, 18 to the support pole 22, they are provided with means generally known to the man skilled in the art, for example co-operating and engaging recesses and protrusions 30. Furthermore on top of the separation wall 17, 18 positioning means 7 may be provided to fix the position of superimposed casings with respect to each other.

Figure 4:
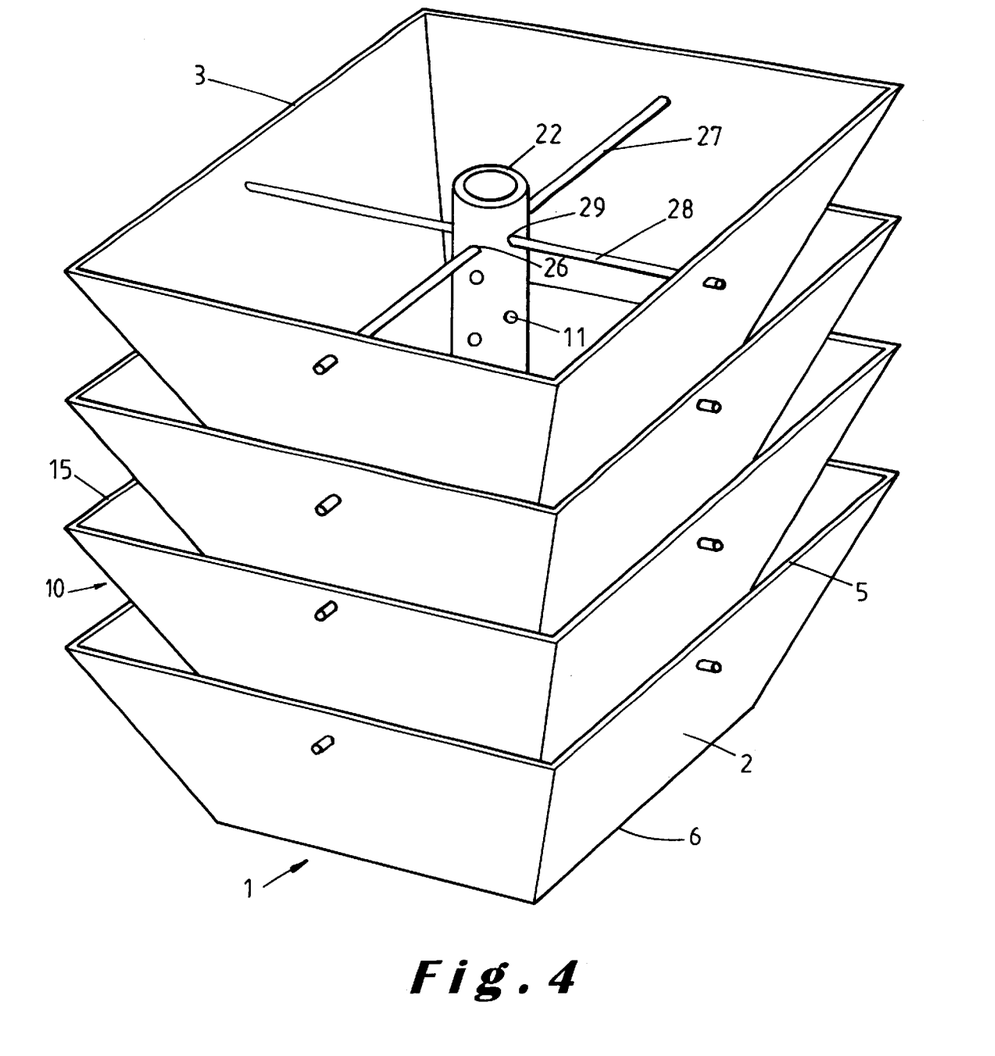
FIG. 4 is a top view to the internal construction device of this invention.
Figure 5:
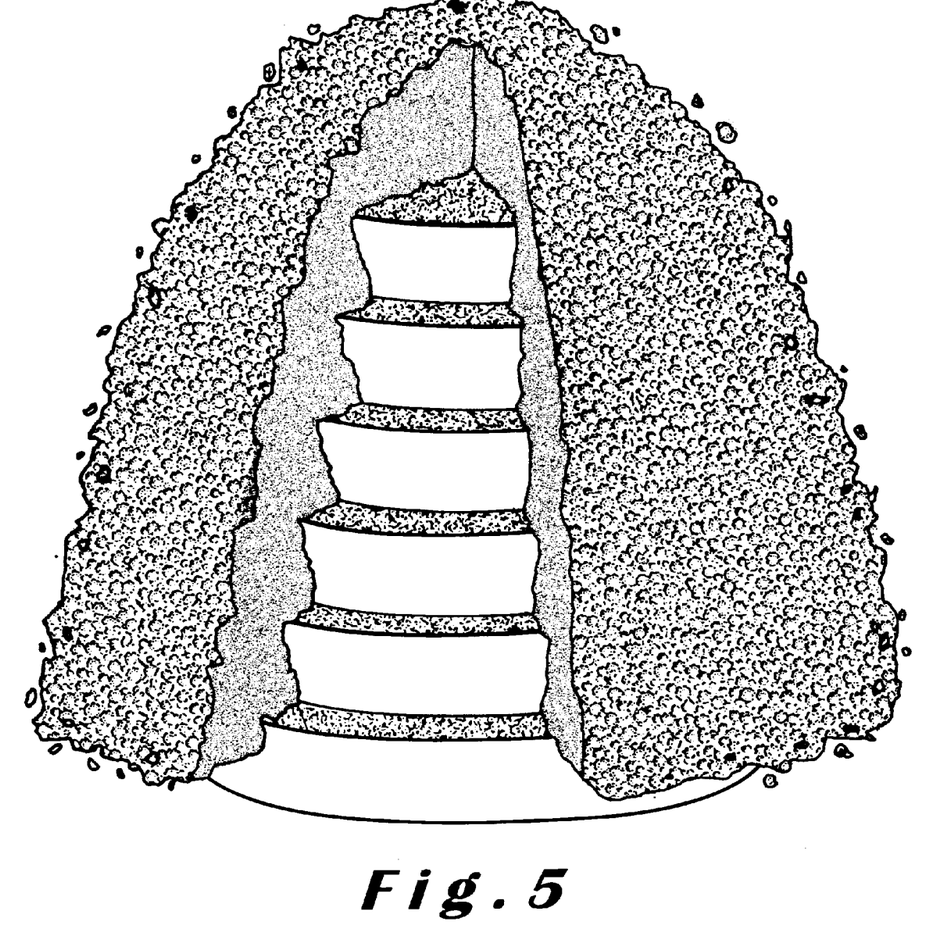
FIGS. 5 and 6 show a view to the internal plant construction device of this invention, hidden by plants.
Figure 6:
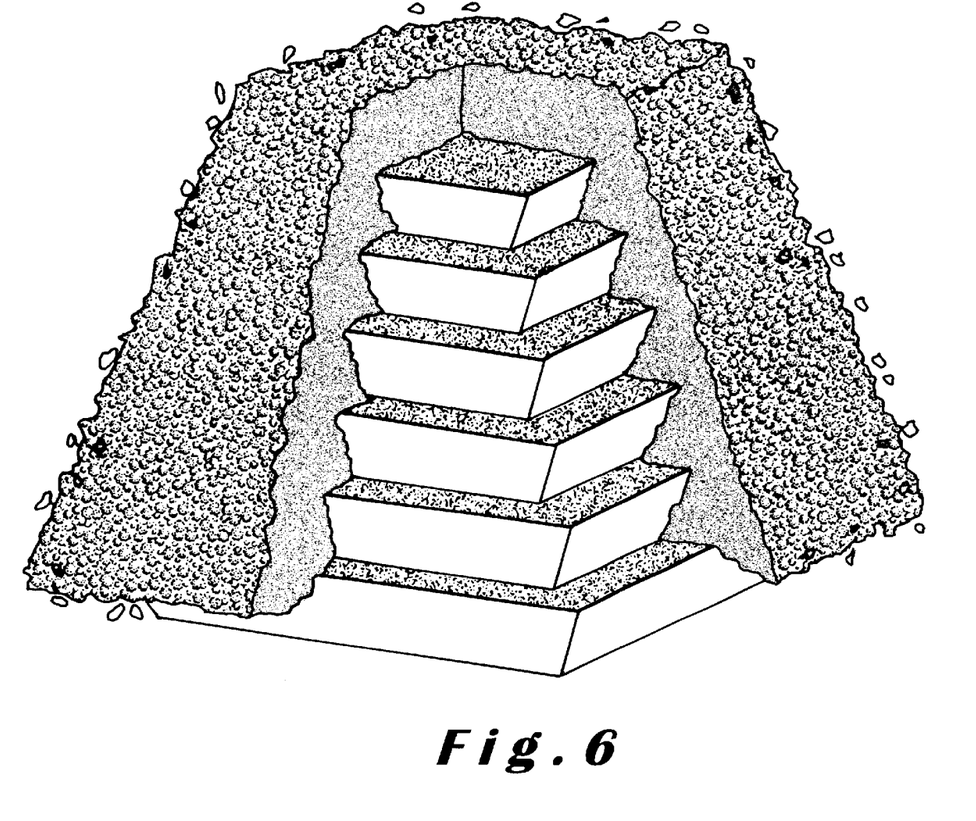

In the part of the internal plant construction device shown in FIG. 4 the upper casing 10 is partially nested in the central storage space 8 of the lower casing. It is however also possible that the bottom 14 of the upper retainer 10 and the upper face 3 of the lower retainer 1 coincide. This can be done by adapting the position of the holes 25 or the height of the separation walls 17, 18. If so desired, the bottom 14 of the upper retainer 10 may be shifted towards the central storage space the lower retainer 1.

Because the upper face 3 of the lower retainer and the bottom 14 of the upper retainer are substantially open, the central storage space 8 of the upper second retainer 10 can pass into the central storage space 8 of the lower first retainer 1 in a continuous manner. This allows that the roots of plants present in the second retainer 10 may grow towards and into the first retainer 1, thus allowing the roots to show an extensive growth and providing the possibility of obtaining strong, healthy and larger plants with an increased life time. Simultaneously, nutrients that are supplied via the second retainer 10, may flow through the bottom 14 of the second upper retainer 10 towards the first retainer 1 underneath, so that in principle it suffices to deliver the nutriments through one retainer.

Figure 3:
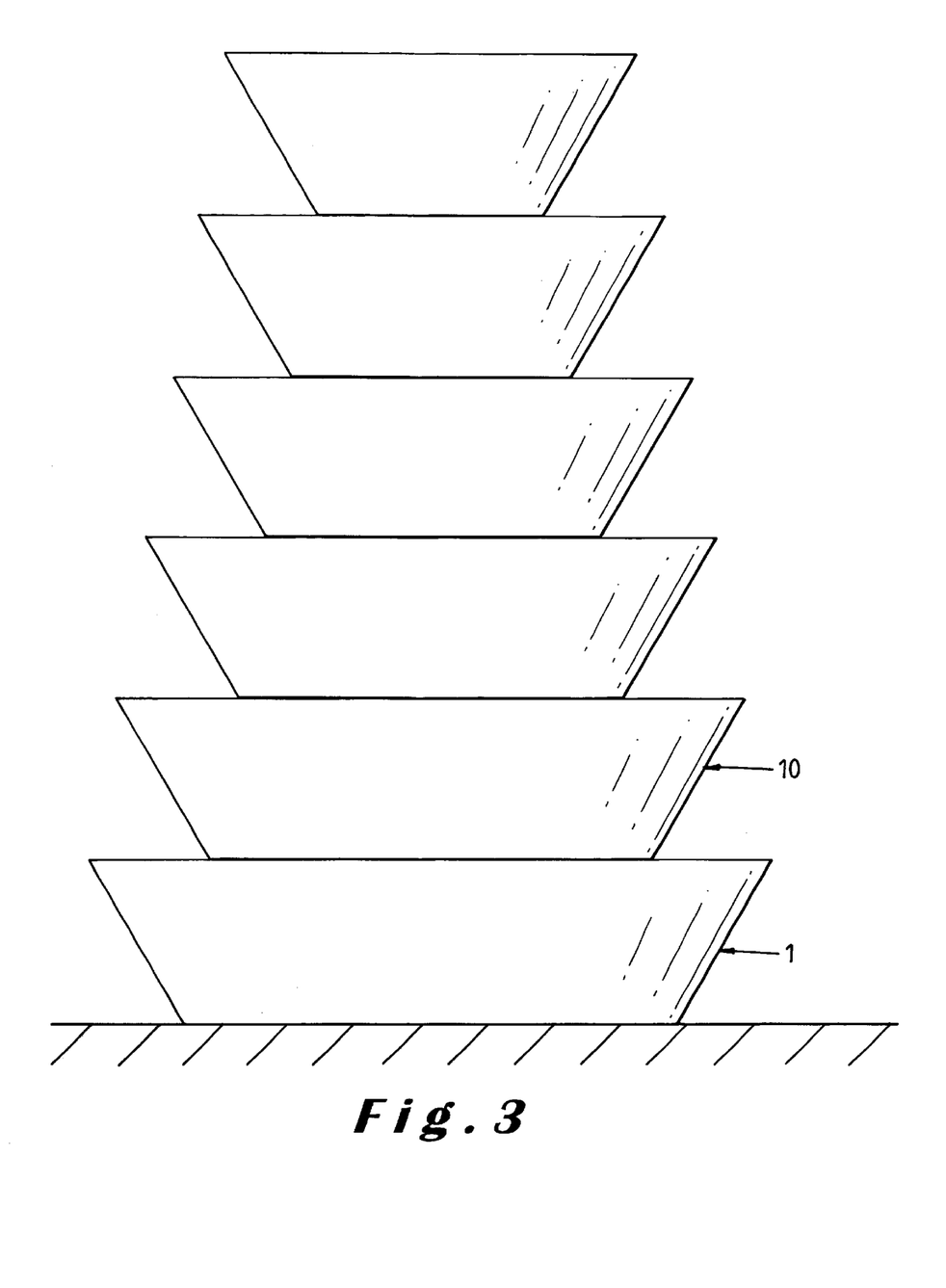
FIG. 3 is a view to the side of an internal construction device of this invention comprising a plurality of superimposed retainers, the dimensions of the retainers decreasing in height direction of the device.

As is shown in FIG. 3 and 4, a plurality of retainers 1, 10 can be combined so as to obtain a construction device of the desired sizes. In the embodiments shown in FIGS. 3 and 4, respectively six and four retainers are fitted on top of each other. Thereby, in the embodiments shown in FIGS. 2, 3 and 4, the walls 2, 12 of retainers 1, 10 positioned on top of each other, run substantially parallel to each other. It is also possible that the walls of an upper retainer are more or less inclined than the walls of a retainer underneath, for example in case it is desired to create an assembly with a particular shape, or to have plants of different sizes in the successive retainers, and more or less space is required thereto.

The construction device of the invention may further comprise a bottom plate 23, with a hole for receiving the support pole 22, so as to allow the device, the plants included to be displaced as one unity. The bottom plate 23 may be placed in the ground or on top of it. Preferably at the edges of the bottom plate 23, hooks 24 or equivalent means are provided for allowing the device to be lifted. Also, by the presence of the bottom plate 23, the device is rendered suitable for placement on a wide variety of locations, such as for example concrete floors or streets or roof gardens.

The construction device of this invention can be assembled by positioning the bottom plate 23 or foot 32. A first retainer 1 is applied to the bottom plate 23 and hung to the support pole 22. The retainer is filled with dirt, a second retainer 10 is positioned upon the first retainer 1, and hung to the support pole 22. Thereafter the plants are planted, along the upper edge 5 of the first retainer 1 and between the side wall of the upper retainer 10 and the retainer underneath 1 (see FIG. 5 and 6). If so desired, additional retainers may be added. The plants are preferably applied in such a way that they fill the space remaining between the upper edge 5 of the first retainer and the wall 12 of the second retainer 10, and that they substantially completely surround the side wall of the second retainer 10, so that after some time this wall 12 after some time will hardly be visible from the outside. In the same way, additional retainers may be added so as to construct a frame of the desired shape and size. In this way a frame can be constructed so as to obtain a tree or a shrub of any desired shape and size. It is for example also possible to provide a frame for constructing a wall covered with plants, or a hedge. In the plant construction device of this invention selected young plant material is planted progressively in a stepwise way, and trimmed so as to obtain an imitation of a grown up plant or to create a full grown plant of a desired shape. The device of this invention is particularly suitable for plants that are suitable to be trimmed and do not exhibit a too large shrub or tree growth, for example creepers, small roses, buxus, taxus, juniperus, cotoneaster, lavender, viburnum etc. Thereby, low growing plants can grow out to large, high plant shapes.

It is also possible to first mount the desired number of retainers 1, 10 on top of each other and/or to suspend them to the support pole 22 then to fill the retainers with growth medium, and then to put in the plants. The man skilled in the art will generally chose the process offering the best prospects of success for obtaining the desired result, e.g., depending on the nature of the plants which have to be put into the assembly.

In the assembly shown in FIG. 3, the first and second retainers have substantially the same shape, and the size of retainers fitted on top of each other transversely decreases with increasing height. This allows to imitate a plant of which the size diminishes as a function of the height, thus to imitate a tapering plant.

In the assembly of FIG. 4 retainers having substantially the same size are fitted on top of each other, the upper side of the retainers being larger than the bottom. This allows, e.g., to imitate a plant of which the size in transverse direction remains constant as a function of the height. It is also possible to have the diameter or width of the plant increase with increasing height. This may be realised by fitting retainers on top of each other, of which the diameter or width is increasing with increasing height of the construction. Thereby, it should always be taken into account that the upper face of the lower retainer has a larger surface area than the bottom of the upper retainer, so that between the side walls of the upper retainer and the retainer underneath an open space remains available to receive plants.

The construction device of this invention solves the problem of many gardeners who want to have in their garden one or more striking, large trees, bushes or plants, as an ornamental or separating element for their garden. Mostly, young, comparatively small plants are bought and planted, which subsequently may be cultivated into full-grown plants, since full-grown plants are mostly rather expensive to buy. In addition to this, upon transplanting a full-grown plant, there is a risk that the plant cannot adapt to the new conditions and dies off. In case a bottom plate is provided, the device of the present invention can be displaced without touching the roots of the plants, so that the risk that the plants would die off when displacing the device, because the roots cannot adapt to the new soil or growing environment, can be minimised. Also the device of this invention allows plants, which otherwise require a particular type of soil or growth medium, to be grown on a ground which would otherwise be incompatible with the plant. In addition to this, the growth medium with which the retainers are provided, and the conditions of moisture and nutrients in a particular retainer can be adapted to the nature of the plants contained therein.

Depending on the type of plant, it may moreover take a few to many years before the small plant has developed into to a large, full-grown plant. With the construction device of this invention, a full-grown plant can be assembled, starting from a plurality of smaller plants. This can be of particular importance, for example for creating a large buxus plant of the desired shape.

The foregoing is a complete description of the invention including, by way of illustration and not by way of limitation, various alternative embodiments. The scope of the invention, therefore, should be limited only by the following claims.

What is claimed is:

1. An internal construction device for assembling a plant from a plurality of smaller plants, the device comprising:
   a support pole extending in the height direction of the device;
   a plurality of superimposed retainers applied around the support pole and nested within each other, the retainers having a central storage volume for receiving dirt and plants and having a substantially open top face;
   supporting means for each retainer in which device a retainer underneath comprises a side wall and a top face with a surface area, and a subsequent retainer comprises a side wall and a bottom face with a surface area, the surface area of the top face of the retainer underneath being larger than the surface area of the bottom face of the subsequent retainer so as to create between the side walls of both retainers a space for receiving plants, characterised in that;
   the retainer is a casing with a side wall and an open bottom face enclosing a central storage space,
   the means for supporting each retainer comprises connecting means for connecting the side wall of the casing to the support pole, and the central storage spaces of subsequent casings transfer into each other.

2. An internal construction device as claimed in claim 1, characterised in that the connecting means are removably connectable to the support pole and the casing.

3. An internal construction device as claimed in claim 1, characterised in that the connecting means comprises at least one support bar with a first and second end, the support bar extending through at least one hole in the support pole, the ends of the support bar being connected to opposing sides of the side-wall of the retainer.

4. An internal construction device as claimed in claim 1, characterised in that each casing is suspended to the support pole.

5. An internal construction device as claimed in claim 1, characterised in that the support pole comprises a plurality of holes which extend throughout the support pole in cross direction thereof and are spaced from each other in height direction of the support pole,
   the holes being arranged in pairs of a first and second hole for receiving perpendicularly extending support bars,
   the ends of each support bar being connected to opposing sides of the side wall of the retainer, in a first pair the first hole extending in a first direction, the second hole extending in a second direction perpendicular to the first direction, and in a subsequent second pair the first hole extending in the second direction, the second hole extending in the first direction.

6. An internal construction device as claimed in claim 5, characterised in that the bottom rim of a subsequent retainer rests on at least one of the support bars provided in a retainer underneath.

7. An internal construction device as claimed in claim 1, characterised in that clamping means are provided to the ends of at least one support bar to allow opposite sides of the side wall to be clamped between the ends of the at least one support bar.

8. An internal construction device as claimed in claim 1, characterised in that the supporting means comprise at least one vertical separation wall for connecting opposite parts of the side wall of the casing, the at least one separation wall having a height which is smaller than or equal to the height of the side wall.

9. An internal construction device as claimed in claim 8, characterised in that the separation wall is removably connectable to the side wall of the casing and to the support pole.

10. An internal construction device as claimed in claim 8, characterised in that each casing comprises two perpendicularly extending separation walls.

* * * * *